April 1, 1958     T. E. BELSHAW     2,828,700
DOUGH FORMER
Filed Jan. 7, 1955     2 Sheets-Sheet 1
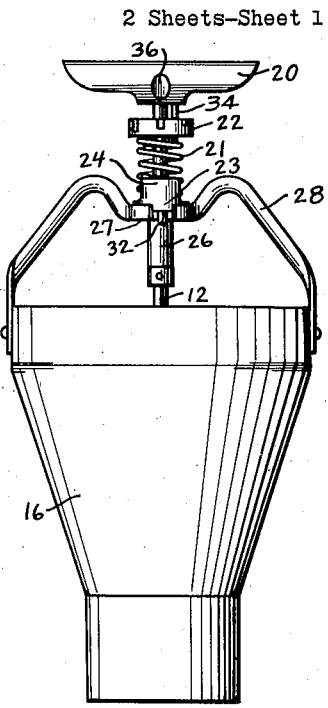
Fig. 1
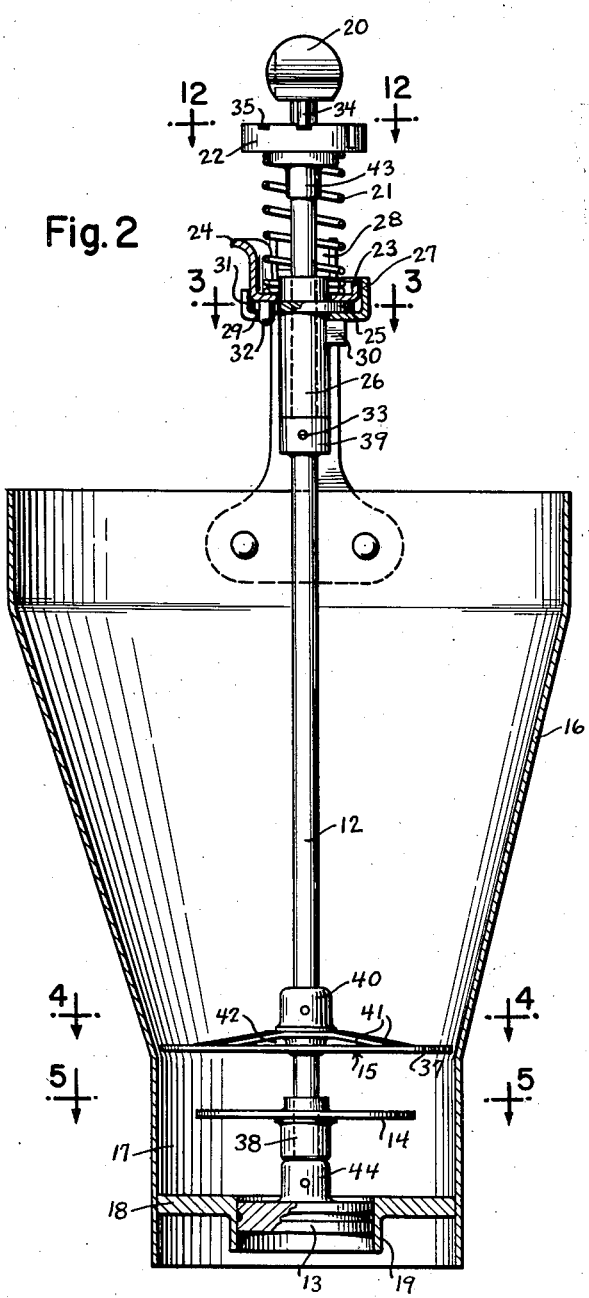
Fig. 2
Fig. 3
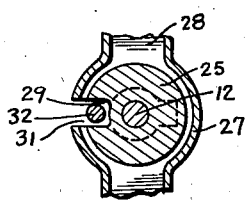
INVENTOR.
Thomas E. Belshaw April 1, 1958　　　T. E. BELSHAW　　　2,828,700
DOUGH FORMER Filed Jan. 7, 1955　　　2 Sheets-Sheet 2

INVENTOR.
Thomas E. Belshaw
BY Barnes, Seed + Searl
attys.

United States Patent Office 2,828,700
Patented Apr. 1, 1958

2,828,700

DOUGH FORMER

Thomas E. Belshaw, Seattle, Wash.

Application January 7, 1955, Serial No. 480,429

5 Claims. (Cl. 107—14)

This invention relates to improvements in dough formers which dispense individual charges of dough in a predetermined shape, and more specifically, improvements in the type of former disclosed in United States Patent No. 2,637,282, issued May 5, 1953.

An object of this invention is to equip such a dough former with an adjusting means whereby the quantity of dough in each formed charge dispensed can be easily varied.

The above-identified prior patent incorporates a check valve to isolate each charge of dough to be formed and dispensed and the present invention aims to provide an improved such valve whose components will have no tendency to adhere to one another.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is an elevational view of my improved dough former.

Fig. 2 is an enlarged view, partly in vertical longitudinal section and partly in elevation, of the dough former and taken at right angles to the view of Fig. 1.

Figure 4:
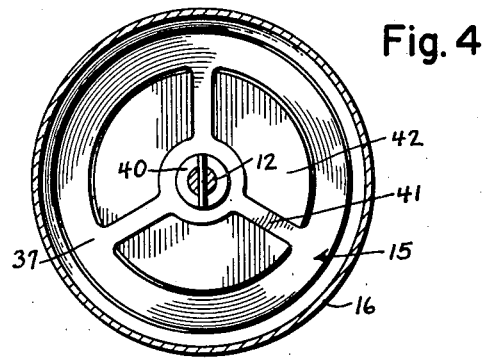
Figure 5:
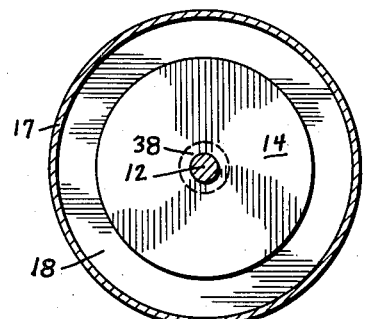

Figs. 3, 4 and 5 are transverse vertical sectional views taken respectively on lines 3—3, 4—4 and 5—5 of Fig. 2.

Figure 10:
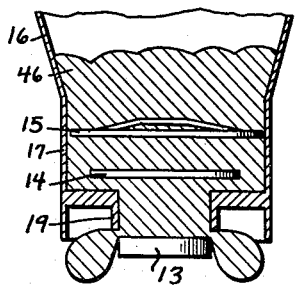
Figure 11:
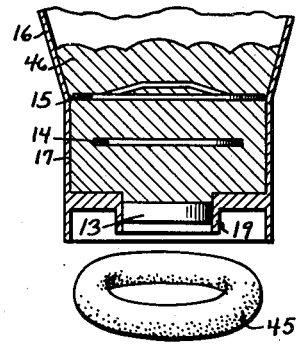
Figure 12:
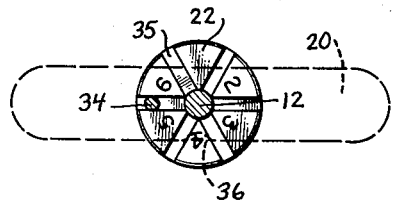

Figs. 6 through 11 illustrated the relative positions of the forming piston and the components of the check valve during the dispensing and forming of a doughnut; and Fig. 12 is a top plan view of the dial with the overlying handle and its depending pin being shown in phantom.

As before mentioned, the present invention is directed to a dough former of the general type disclosed in U. S. Patent No. 2,637,282, and namely one in which a rod 12 with a forming piston 13 at its lower end and carrying a check valve unit 14–15 is reciprocated in a hopper 16. This hopper has a valve chamber 17 into which dough from the hopper is metered by the check valve and discharged through a reduced discharge tube 19 carried by a transverse plate 18 fitted into the lower end of the valve chamber.

The rod 12 has a handle 20 at its upper end and is yieldingly urged upwardly by a spring 21 which bears at its upper end against the base of a disc-shaped dial 22 and is seated at its lower end on a cupped lock ring 23. This lock ring has a handle 24 and engages a circular flange 25 provided near the upper end of a sleeve 26 through which the rod is journaled for reciprocating endwise movement. It will be seen that the flange 25 in turn rests upon a dished seat 27 formed at the center of a bail 28 which is riveted at its ends to the rim of the hopper. The sleeve 26 is formed with a lug 30 spaced below the flange 25 a distance slightly greater than the thickness of the bail seat 27. The latter has a center opening for receiving the sleeve 26, and as best shown in Figs. 2 and 3; this center opening is intersected by a slot 31 formed in the bail for receiving a locking finger 32 depending from the lock ring 23 and passing through a slot 29 in the flange 25. As will later appear obvious, the slot 31 must be wide enough to permit passage therethrough of the rod 12 and the lug 30 during assembly of the dough former.

Upward movement of the rod with respect to the hopper due to action of the spring 21 is limited by an adjustable collar 39 which bears against the lower end of the sleeve 26 when the rod is at its upper limit of travel. A set screw 33 is provided for adjustably securing the collar to the rod. Depending from the dial 22 and encircled by the spring 21 is a boss 43 which serves as a stop to limit downward movement of the rod. This stop engages the upper end of the sleeve before the spring 21 reaches a fully compressed condition.

The dial 22 with its depending boss 43 is journaled on the rod 12 for turning adjustment relative to a pin 34 projecting downwardly toward the dial from the base of the handle 20. On its upper face the dial is formed with evenly spaced radial grooves 35 of different and of progressively varying depths for receiving the pin 34. Between these grooves, the dial is scribed with consecutive numerals as shown in Fig. 12 and the handle is vertically grooved at 36 to fully expose one of said numerals to view at a time. Thus each groove 35 is given an identifying numeral which is only fully exposed when the pin 34 fits into the groove. The numerals are desirably so arranged that the lowest numeral corresponds to the shallowest groove.

Directing attention to the lower end of Fig. 2 it is seen that the check valve unit 14—15 comprises a component 15 of wheel-like configuration rigidly secured to the rod 12 and a disc-like component 14 floating on the rod and supported by a hub 38 between component 14 and the forming piston 13. The outer diameter of the rim 37 of the wheel-like component corresponds to the inside diameter of the valve chamber 17 and the outer diameter of the floating component approximates the inside diameter of the rim 37. Extending inwardly from the latter to a hub 40 and dished upwardly are spokes 41 providing sectorial openings 42 therebetween. The hub 40 is secured to the rod 12 and extends downwardly to the plane of the lower face of the rim 37. It will be noted that the hub 38 projects upwardly somewhat above the floating component so as to act as a stop to keep the two check valve components spaced apart slightly by a minimum gap. This gap is such that the components 14, 15 can never stick together and yet is narrow enough to insure a substantial cut-off of dough from the hopper 16 to the valve chamber 17. Such a cut-off is possible because of the viscosity of the dough. The length of the hub 38 below the floating component is such that the latter is always spaced above the plate 18 and even when the forming piston is at its lowest limit of travel.

In putting together the rod assembly with the hopper assembly the portion of the rod 12 subjacent the collar 39 is slipped sideways through the slot 31 into the center opening in the bail seat 27 and is turned to bring the lug 30 into alignment with this slot. The sleeve is then lowered through the bail seat until the lug 30 passes through the slot 31 and the flange 25 engages the latter. While this is being done the forming piston 13 is introduced into the discharge tube 19. To fully seat the flange 25 on the bail seat and lower the lug 30 therebeneath, the handle 24 on the lock ring 23 must be lifted slightly against the pressure of the spring 21 to raise the free end of the locking finger up to the level of the bottom face of the flange 25. The rod assembly is then turned a half turn to bring the locking finger 32 and the flange slot 29 into alignment with the slot 31 in the bail seat and lock the latter between the flange 25 and the lug 30. The handle 24 is then released so that the locking finger 32 is free to lower into the slot 31. Reversing these steps will effect a release of the rod assembly from the bail.

Figure 6:
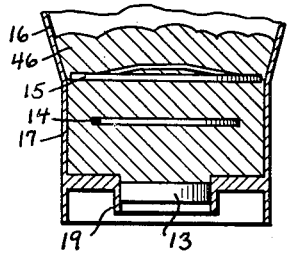
Figure 7:
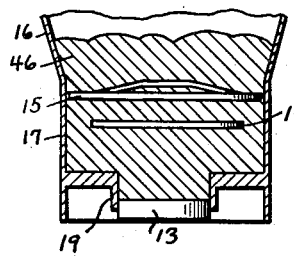
Figure 8:
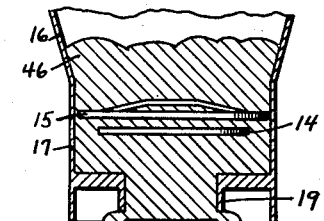
Figure 9:
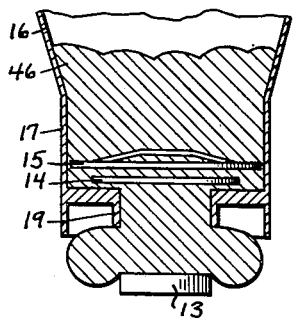

The operation of the device in forming a doughnut is shown schematically in Figs. 6 to 11, inclusive. Fig. 6 shows the hopper 16 and the valve chamber 17 full of dough 46, and the valve components 14, 15 and forming piston 13 in their upper, or raised, position. It should be kept in mind that the piston 13 and valve component 15 are held in position by being secured to the rod 12, and the floating valve component 14, loosely sliding on the rod 12, is held in its normal position by the underlying forming piston, and more specifically by an upstanding boss 44 presented by the latter. As the rod 12 carries the valve component 15 and the piston 13 downward, as in Fig. 7, the rod will slide through the hub of the floating valve component 14, dough will be pulled into the discharge tube 19 and the hub 40 of the downwardly moving valve component 14 will engage the hub 38 of the floating component 15 so that the check valve will substantially isolate the hopper 16, as in Fig. 8. At the point of closure of the check valve 14—15, the piston 13 will leave the discharge tube 19 and further downward movement of the piston and check valve components will extrude dough past the piston 13, as in Fig. 9. The uppermost position of rod 12 and the extent of its downward movement with its associated parts is determined by the setting of the pin 34 on the dial 22.

As the rod then moves upward, the forming piston 13 enters the discharge tube 9, the doughnut 45 is cut off, as in Fig. 10, and the valve component 15 leaves the floating valve component 14. Further upward movement brings the piston boss 44 against the under side of the hub of the floating component and raises the latter. This upward movement of the floating valve component draws dough from the hopper 16 and through the valve opening 42 into the valve chamber 17. The upward movement of the rod 12 and its associated parts is limited by the adjustable collar 39 bearing against the sleeve 26 which is locked in the bail 28. The device in this position, Fig. 11, is then ready for another cycle.

The advantages of the invention, it is thought, will have been clearly understood from the foregoing detailed description of the illustrated preferred embodiments. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

I claim:

1. In a dough former, a support assembly, a rod mounted for endwise reciprocating movement through said assembly, a handle on one end of the rod, a dial sleeved on the rod between the handle and assembly and having a plurality of radially extending grooves of different depths spaced therearound and exposed toward the handle, a finger extending from the handle in the direction of the dial and arranged to selectively co-fit with said grooves when the handle is turned with respect to the dial, a stop on the rod and arranged to engage said assembly for limiting the travel of said other end of the rod toward said assembly during said movement of the rod, and a spring mounted in compressed relationship between said dial and assembly for yieldingly urging the dial into co-fitting relation with the finger and for yieldingly resisting endwise movement of said other end of the rod away from said assembly.

2. In a dough former, a support assembly, a rod mounted for endwise reciprocating movement through said assembly, a handle on one end of the rod, a dial sleeved on the rod between the handle and assembly and having formed therein a plurality of indentations of different depths spaced therearound at equal distance from the center of the dial and exposed toward the handle, a finger extending from the handle in the direction of the dial and arranged to selectively co-fit with said indentations when the handle is turned with respect to the dial, a stop on the rod and arranged to engage said assembly for limiting the travel of said other end of the rod toward said assembly during said movement of the rod, and a spring mounted in compressed relationship between said dial and assembly for yieldingly urging the dial into co-fitting relation with the finger and for yieldingly resisting endwise movement of said other end of the rod away from said assembly.

3. The dough former of claim 2 in which different indicia are provided on the dial between said indentations and are arranged such as to be substantially hidden from view by said handle when the dial is viewed from the handle end of said rod, said handle having a recess formed in one side thereof to expose to view the indicium corresponding to the indentation in which said finger is fitted.

4. In a dough former, a support assembly, a rod mounted for endwise reciprocating movement through said assembly, a handle on one end of the rod, cooperating dial means and finger means, said dial means having a plurality of indentations of different depths spaced therearound at equal distances from the center thereof and exposed toward said finger means, one of said means being sleeved on the rod between the handle and assembly and the other said means being secured to the handle, a stop on the rod and arranged to engage said assembly for limiting the travel of said other end of the rod toward said assembly during said movement of the rod, and a spring mounted in compressed relationship between said assembly and the said means which is sleeved on the rod for yieldingly urging said finger means and dial means into co-fitting relation and for yieldingly resisting endwise movement of said other end of the rod away from said assembly.

5. The dough former of claim 4 in which means are provided for selectively varying the location of said stop with respect to the ends of said rod to thereby regulate the maximum travel of said other end of the rod toward said assembly.

References Cited in the file of this patent

UNITED STATES PATENTS

| 1,724,766 | McCauley | Aug. 13, 1929 |
| 1,738,033 | Belshaw | Dec. 3, 1929 |
| 2,197,270 | Helland | Apr. 16, 1940 |
| 2,637,282 | Belshaw et al. | May 5, 1953 |
| 2,643,621 | Belshaw | June 30, 1953 |